United States Patent
Fargo

(10) Patent No.: US 10,214,387 B2
(45) Date of Patent: Feb. 26, 2019

(54) MAGNETIC ELEVATOR DRIVE MEMBER AND METHOD OF MANUFACTURE

(71) Applicant: OTIS ELEVATOR COMPANY, Farmington, CT (US)

(72) Inventor: Richard N. Fargo, Plainville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 209 days.

(21) Appl. No.: 15/154,190

(22) Filed: May 13, 2016

(65) Prior Publication Data

US 2017/0327347 A1 Nov. 16, 2017

(51) Int. Cl.
| | |
|---|---|
| *B66B 9/02* | (2006.01) |
| *B66B 11/04* | (2006.01) |
| *B23K 1/19* | (2006.01) |
| *B23K 5/02* | (2006.01) |
| *H02K 1/22* | (2006.01) |
| *H02K 5/04* | (2006.01) |
| *H02K 7/10* | (2006.01) |

(52) U.S. Cl.
CPC ............ *B66B 11/0438* (2013.01); *B23K 1/19* (2013.01); *B23K 5/02* (2013.01); *H02K 1/22* (2013.01); *H02K 5/04* (2013.01); *H02K 7/10* (2013.01); *B66B 9/025* (2013.01)

(58) Field of Classification Search
CPC ....... B66B 11/0438; B66B 9/025; B23K 1/19; B23K 5/02; H02K 1/22; H02K 5/04; H02K 7/10
USPC ........................................................ 187/267
See application file for complete search history.

(56) References Cited

U.S. PATENT DOCUMENTS

| | | |
|---|---|---|
| 4,402,386 A | 9/1983 | Ficheux et al. |
| 5,079,458 A | 1/1992 | Schuster |
| 5,465,433 A | 11/1995 | Nolan |
| 5,467,850 A | 11/1995 | Skalski |
| 5,913,401 A | 6/1999 | Tamura et al. |
| 7,124,495 B2 | 10/2006 | Gieras et al. |
| 7,195,107 B2 | 3/2007 | Gauthier et al. |
| 7,663,282 B2 | 2/2010 | Ogava |
| 7,881,602 B2 | 2/2011 | Aoshima |
| 9,010,498 B2 | 4/2015 | Hsieh |
| 9,206,016 B2 | 12/2015 | Breidenstein et al. |
| 2008/0179142 A1 | 7/2008 | Chuo et al. |
| 2009/0251258 A1 | 10/2009 | Rhinefrank et al. |
| 2011/0061976 A1 | 3/2011 | Tiner |

(Continued)

FOREIGN PATENT DOCUMENTS

| | | |
|---|---|---|
| CN | 101117193 A | 2/2008 |
| CN | 101951038 A | 1/2011 |

(Continued)

OTHER PUBLICATIONS

Extended European Search Report for Application No. EP 17 17 1151 dated Sep. 27, 2017.

*Primary Examiner* — Jeffrey Donels
(74) *Attorney, Agent, or Firm* — Carlson, Gaskey & Olds

(57) ABSTRACT

An illustrative example method of making a magnetic drive component includes inserting a plurality of metal teeth into a metal tube. The teeth respectively have a first portion received against an inner surface of the tube. The teeth respectively have a second portion and a third portion spaced apart and projecting toward a center of the tube. The method includes securing the plurality of teeth to the tube.

24 Claims, 2 Drawing Sheets

(56) References Cited

U.S. PATENT DOCUMENTS

| | | |
|---|---|---|
| 2013/0248296 A1 | 9/2013 | Husmann |
| 2015/0171671 A1 | 6/2015 | Tenhunen et al. |
| 2015/0307325 A1 | 10/2015 | Fargo |
| 2015/0360908 A1 | 12/2015 | Chen |
| 2015/0368071 A1 | 12/2015 | Witczak et al. |
| 2017/0117760 A1* | 4/2017 | Greenlaw .............. H02K 1/146 |

FOREIGN PATENT DOCUMENTS

| | | |
|---|---|---|
| CN | 201854099 U | 6/2011 |
| CN | 102556809 A | 7/2012 |
| CN | 202334033 U | 7/2012 |
| CN | 103057548 A | 4/2013 |
| CN | 203734397 U | 7/2014 |
| DE | 102010046060 A1 | 3/2012 |
| EP | 1870985 A1 | 12/2007 |
| WO | 94/14695 | 7/1994 |
| WO | 0210051 A2 | 2/2002 |
| WO | 02057171 A1 | 7/2002 |
| WO | 03052901 A1 | 6/2003 |
| WO | 2011042036 A1 | 4/2011 |
| WO | 2011/080390 A1 | 7/2011 |
| WO | 2014030906 A1 | 2/2014 |
| WO | 2014/182272 A1 | 11/2014 |
| WO | 2015/023263 A1 | 2/2015 |

* cited by examiner

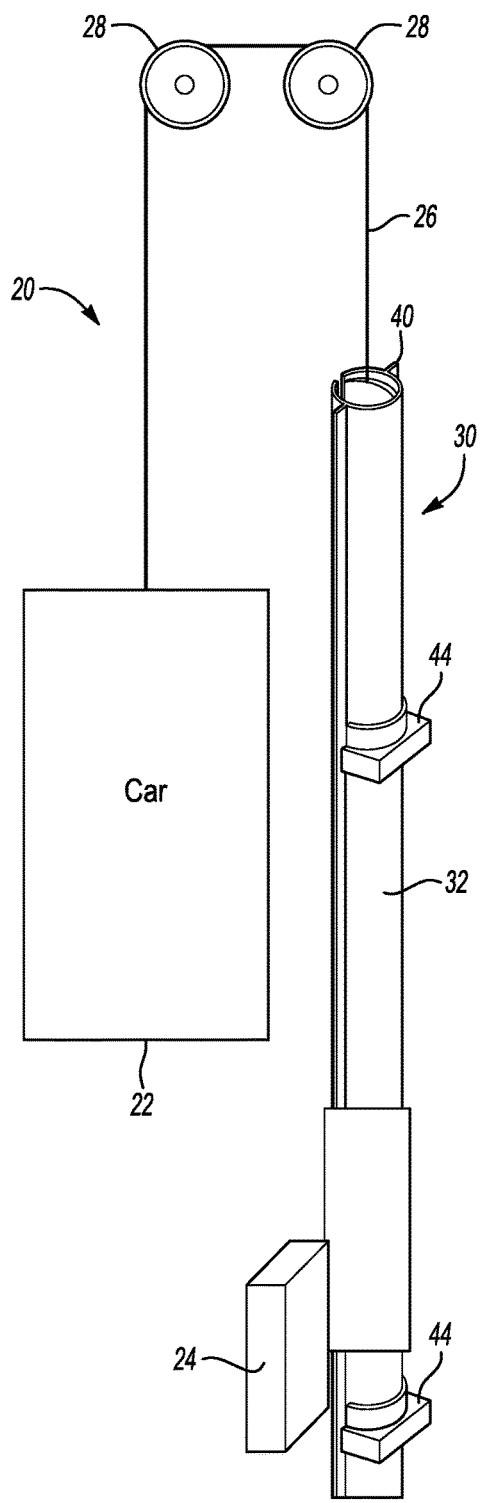
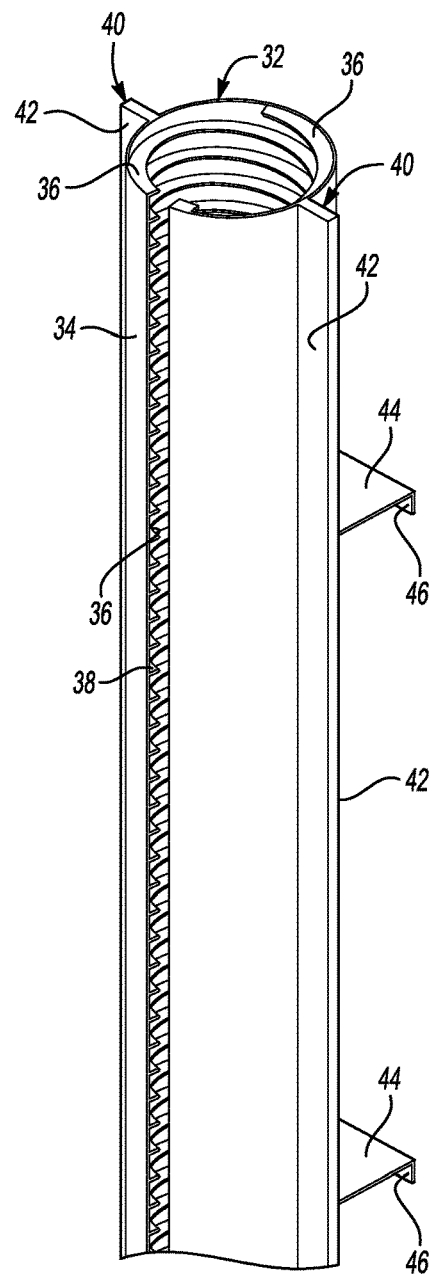
Fig-1
Fig-2

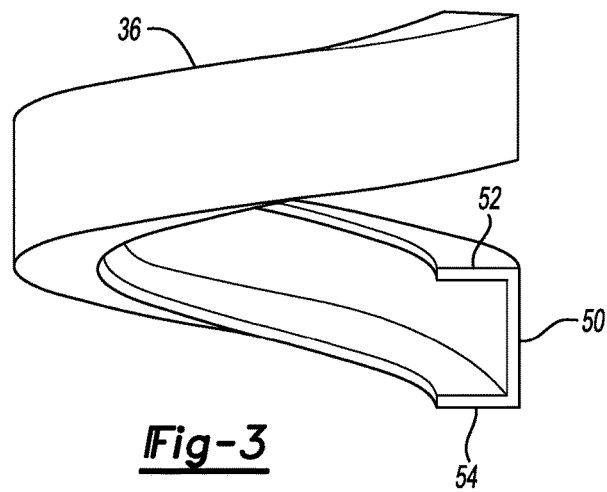
Fig-3
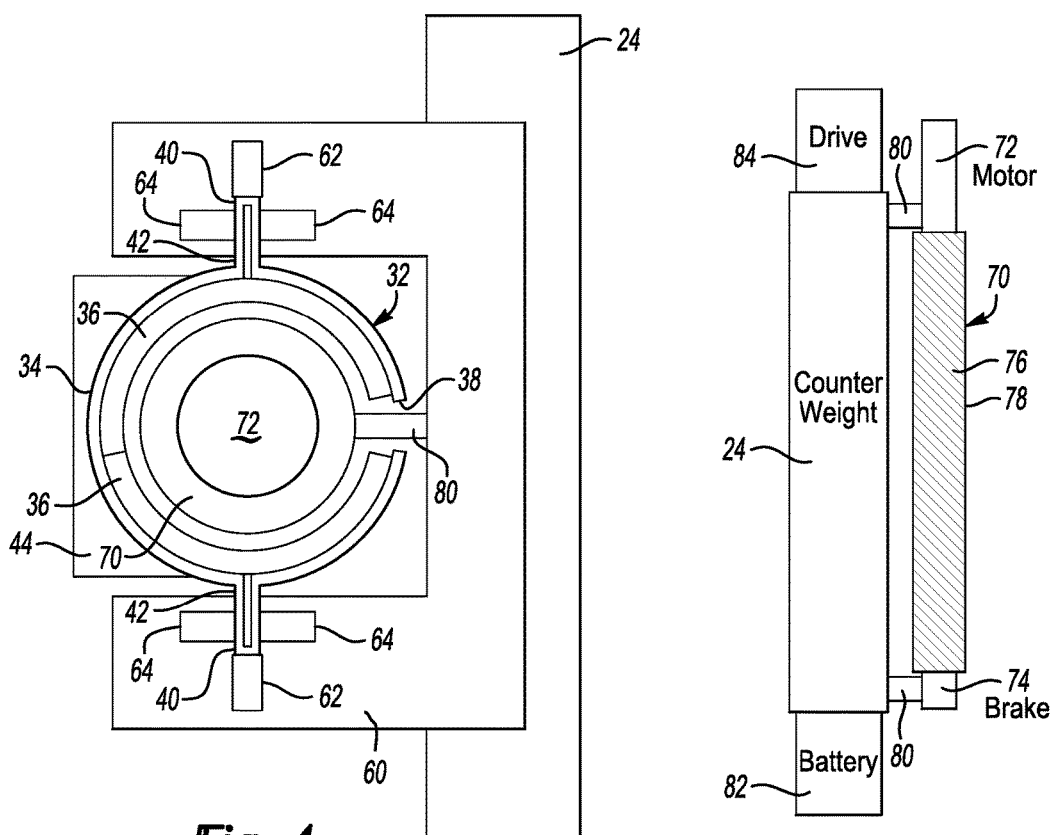
Fig-4
Fig-5

MAGNETIC ELEVATOR DRIVE MEMBER AND METHOD OF MANUFACTURE

BACKGROUND

Elevator systems are in widespread use. The mechanism for propelling an elevator car may be hydraulic or traction-based. Modernization efforts have recently focused on replacing round steel ropes in traction-based systems with lighter weight belts, for example, and reducing the size of the machine components.

It has more recently been proposed to change elevator propulsion systems to include a magnetic drive. Linear and rotary magnetic drive arrangements are known in various contexts. It has recently been proposed to include a rotary magnetic arrangement for propelling an elevator car. One such arrangement is described in the United States Patent Application Publication No. US 2015/0307325. While such arrangements have potential benefits and advantages, implementing them on a commercial scale is not without challenges. For example, material and manufacturing costs could become prohibitively expensive. Another issue presented to those skilled in the art is how to realize an arrangement of components to ensure efficient and reliable operation.

SUMMARY

An illustrative example method of making a magnetic drive component includes inserting a plurality of metal teeth into a metal tube. The teeth respectively have a first portion received against an inner surface of the tube. The teeth respectively have a second portion and a third portion spaced apart and projecting toward a center of the tube. The method includes securing the plurality of teeth to the tube.

In an example embodiment having one or more features of the method of the previous paragraph, the securing comprises brazing.

In an example embodiment having one or more features of the method of either of the previous paragraphs, the securing comprises simultaneously securing all the teeth to the tube using furnace brazing.

In an example embodiment having one or more features of the method of any of the previous paragraphs, the securing comprises spot welding.

In an example embodiment having one or more features of the method of any of the previous paragraphs, the securing comprises seam welding.

In an example embodiment having one or more features of the method of any of the previous paragraphs, the tube includes a longitudinal slot, the teeth respectively include a slot, and the slots of the teeth are aligned with the longitudinal slot of the tube.

An example embodiment having one or more features of the method of any of the previous paragraphs includes providing guiding surfaces on an outside of the tube. The guiding surfaces extend parallel to a longitudinal axis of the tube.

In an example embodiment having one or more features of the method of any of the previous paragraphs, the guiding surfaces are on pieces projecting outwardly from an outer portion of the tube.

An example embodiment having one or more features of the method of any of the previous paragraphs includes situating a rotatable member including a plurality of magnets within an interior of the tube with the second portions and third portions of the teeth facing the magnets and with spacing between the magnets and the teeth, supporting the rotatable member on an elevator component that is moveable parallel to the longitudinal axis of the tube, and situating at least one guide member of the elevator component on at least one of the guiding surfaces, wherein the guide member and the guiding surface maintain a desired spacing between the magnets and the second portions of the teeth and a desired spacing between the magnets and the third portions of the teeth.

An example embodiment having one or more features of the method of any of the previous paragraphs includes situating a rotatable member including a plurality of magnets within an interior of the tube with the second portions and third portions of the teeth facing the magnets and with spacing between the magnets and the second portions and third portions of the teeth, and situating a motor associated with the rotatable member within the interior of the tube, wherein the motor selectively causes rotation of the rotatable member.

An example embodiment having one or more features of the method of any of the previous paragraphs includes situating a rotatable member including a plurality of magnets within an interior of the tube with the second portions and third portions of the teeth facing the magnets and with spacing between the magnets and the second portions and third portions of the teeth, and situating a brake associated with the rotatable member within the interior of the tube, the brake selectively resisting rotation of the rotatable member.

An illustrative example embodiment of a magnetic drive assembly includes a metal tube and a plurality of metal teeth inside the tube. The teeth respectively have a first portion received adjacent an inner surface of the tube. The teeth respectively have a second portion and a third portion spaced apart and projecting toward a center of the tube. At least one guiding surface on an outer portion of the tube extends parallel to a longitudinal axis of the tube.

An embodiment having one or more features of the assembly of the previous paragraph includes a plurality of bracket members secured to the outer portion of the tube. The bracket members respectively have a mounting portion that is configured for securing the bracket member to a wall.

In an example embodiment having one or more features of the assembly of either of the previous paragraphs, the teeth are secured to the tube.

In an example embodiment having one or more features of the assembly of any of the previous paragraphs, the teeth are secured to the tube by at least one of brazing, spot welding, and seam welding.

In an example embodiment having one or more features of the assembly of any of the previous paragraphs, the tube includes a longitudinal slot, the teeth respectively include a slot, and the slots of the teeth are aligned with the longitudinal slot of the tube.

In an example embodiment having one or more features of the assembly of any of the previous paragraphs, the guiding surfaces are on pieces projecting outwardly from the outer portion of the tube.

In an example embodiment having one or more features of the assembly of any of the previous paragraphs, the teeth are generally helical and the plurality of teeth define a plurality of helical paths inside the tube.

In an example embodiment having one or more features of the assembly of any of the previous paragraphs, the teeth have a generally U-shaped cross-section.

An example embodiment having one or more features of the assembly of any of the previous paragraphs includes a rotatable member including a plurality of magnets within an interior of the tube with the second portions and third portions of the teeth facing the magnets and with spacing between the magnets and the teeth. The rotatable member is supported on an elevator component that is moveable parallel to the longitudinal axis of the tube. At least one guide member associated with the elevator component is situated on the at least one guiding surface. The guide member and guiding surface maintain a desired spacing between the magnets and the second portions of the teeth and a desired spacing between the magnets and the third portions of the teeth.

An example embodiment having one or more features of the assembly of any of the preceding paragraphs includes a motor associated with the rotatable member within the interior of the tube, the motor selectively causing rotation of the rotatable member; and a brake associated with the rotatable member within the interior of the tube, the brake selectively resisting rotation of the rotatable member.

An example embodiment having one or more features of the assembly of any of the preceding paragraphs includes a battery supported on the elevator component, the battery providing power for operating the motor; and an electrical drive device supported on the elevator component, the electrical drive device controlling operation of the motor.

In an example embodiment having one or more features of the assembly of any of the preceding paragraphs, the elevator component comprises a counterweight.

An example embodiment having one or more features of the assembly of any of the preceding paragraphs includes a power source supported on the elevator component, the power source providing power for moving the rotatable member relative to the teeth; and control electronics supported on the elevator component, the control electronics controlling movement of the rotatable member relative to the teeth.

The various features and advantages of at least one disclosed embodiment will become apparent to those skilled in the art from the following detailed description. The drawings that accompany the detailed description can be briefly described as follows.

BRIEF DESCRIPTION OF THE DRAWINGS

FIG. 1 schematically illustrates selected portions of an elevator system including a magnetic drive component designed according to an embodiment of this invention.

FIG. 2 diagrammatically illustrates selected features of an example magnetic drive component designed according to an embodiment of this invention.

FIG. 3 diagrammatically illustrates an example tooth configuration useful within the embodiment of FIG. 2.

FIG. 4 is a top view schematically illustrating a relationship between selected components of an elevator system incorporating a magnetic drive.

FIG. 5 schematically illustrates an example arrangement of selected portions of an elevator system including a magnetic drive.

DETAILED DESCRIPTION

FIG. 1 schematically illustrates selected portions of an elevator system 20. An elevator car 22 is coupled with a counterweight 24 using a roping arrangement 26. A plurality of idler sheaves 28 provide a path along which the roping arrangement 26 moves to facilitate vertical movement of the elevator car 22.

The elevator system 20 includes a magnetic drive assembly 30 that is configured to use known magnetic motor principles to achieve vertical movement of the elevator car 22. In the illustrated example, the magnetic drive 30 includes a stationary portion 32. As can be appreciated from FIG. 2, the stationary portion 32 comprises a tube 34. In this example, the tube 34 is made from a sheet of metal that is bent or otherwise formed into the configuration shown in the drawings. A plurality of teeth 36 are inserted into the tube 34. In this example, the tube 34 includes a longitudinal slot 38. In this example, the slot 38 extends along the entire length of the tube 34.

The tube 34 includes portions 40 that establish guiding surfaces 42 on an exterior of the tube 34. The guiding surfaces 42 extend parallel to a longitudinal axis of the tube 34. In this example, the portions 40 are formed by bending the sheet of metal material used to establish the tube 34. The portions 40 extend outwardly away from an outside surface on the tube 34.

The example of FIG. 2 includes stiffener brackets 44 that provide enhanced structural rigidity for the tube 34. The brackets 44 include mounting surfaces 46 that are configured to facilitate securing the brackets 44 to a wall, such as a wall inside of an elevator hoistway.

As can be appreciated from FIG. 3, each of the teeth 36 have a generally helical configuration. The plurality of teeth 36 within the tube 34 define a plurality of helical pathways along the length of the tube 34.

Each of the teeth has a first portion 50 that is received adjacent to an interior surface of the tube 34. In this example, the first portion 50 is received directly against the inside surface on the tube 34. Each tooth 36 has a second portion 52 and a third portion 54 spaced apart from each other and projecting inwardly toward a center of the tube 34. As can be appreciated from FIG. 3, the teeth 36 respectively have a U-shaped cross-section. In the illustrated arrangement, the cross-section comprises a generally rectangular U-shape.

In an example embodiment, the teeth 36 are formed by bending a sheet of metal or otherwise forming it into the configuration shown in FIG. 3. One feature of the configuration of the teeth 36 is that they provide additional structural rigidity to the tube 34 when the teeth 36 are secured to the tube 34. Some embodiments include brazing the teeth 36 to the tube 34. One example embodiment utilizes a brazing furnace for simultaneously securing all of the teeth 36 to the tube 34. Another example embodiment includes using spot welding for securing the teeth 36 to the tube 34. Another embodiment includes using seam welding for securing the teeth 36 in place.

Using bent metal pieces for the tube 34 and the teeth 36 provides economic efficiencies and cost savings for making a stationary magnetic drive component that can extend along a desired length of a hoistway in a vertical direction as schematically shown in FIG. 1, for example.

FIG. 4 is an end view showing an example arrangement including a mounting member 60 secured to the counterweight 24. Guide members 62, such as sliding guide shoes or rollers, are supported by the mounting member 60 so that the guide member 62 engages one of the guiding surfaces 42 on the outside of the tube 34. Additional guiding members 64 are provided in the illustrated example.

Referring to FIGS. 4 and 5, a rotatable magnetic drive member 70 is received within the interior of the tube 34. The rotatable magnetic drive member 70 has an associated motor 72 that is also received within the interior of the tube 34. In this example, a brake 74 is associated with the rotatable magnetic drive member 70 for purposes of stopping or controlling a speed of rotation of the drive member 70. The brake 74 is also configured to fit within the interior of the tube 34.

The magnetic drive member 70 includes a plurality of magnets 76 and 78 arranged in a helical pattern. The magnets 76 and 78 cooperate with the teeth 36 using known magnetic motor or drive principles so that rotary motion of the magnetic drive member 70 within the interior of the tube 34 results in vertical movement of the magnetic drive member 70 relative to the tube 34.

A plurality of connectors 80 connect the counterweight 24 to the magnetic drive member 70 so that the counterweight 24 moves with the magnetic drive member 70 relative to the magnetic drive member 32.

In the example of FIG. 5, a battery 82 and drive electronics 84 for controlling the rotary motion of the drive member 70 are supported on the counterweight 24. One feature of including drive electronics 84 and a battery 82 on the counterweight 24 is that cost savings become possible by reducing the requirement for a traveling cable. The example configuration of FIG. 5 also provides better utilization of space within a hoistway. Another feature is that the wiring between the battery 82, drive electronics 84 and the motor 72 can all be packaged together in a factory and installed as a unit. This provides additional efficiencies and cost savings for installing elevator systems that incorporate a magnetic drive designed according to an embodiment of this invention.

One of the features of having the portions 40 on the stationary drive member 32 establish guiding surfaces 42 is that when an arrangement like that shown in FIG. 4 is used, the guiding surfaces 42 provide structure for maintaining a desired alignment of the rotary magnetic drive member 70 relative to the stationary magnetic drive member 32. The illustrated embodiment provides reliable control over the spacing between the magnets 76 and 78 and the teeth 36. In particular, the spacing between the edges of the second portions 52 and the edges of the third portions 54 on the one hand and the magnets 76 and 78 on the other hand can be reliably controlled within desired tolerances to maintain a consistent magnetic gap during elevator system operation. Providing a consistent magnetic gap provides for smoother and more consistent operation, which results in better elevator ride quality.

In one example, the spacing within the interior of the tube 34 within which the magnetic drive member 70 fits has a 210 mm diameter. Relatively small-sized components can be used with the illustrated configuration, which provides additional cost savings.

One of the features of the illustrated example is that it eliminates machinery at the top of a hoistway and eliminates traction-related weight limitations on elevator system components. Reducing car weight and counterweight requirements reduces the amount of material needed for making an elevator system, which provides additional savings.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of making a magnetic drive component, the method comprising:
    inserting a plurality of metal teeth into a metal tube, the teeth respectively having a first portion received adjacent an inner surface of the tube, the teeth respectively having a second portion and a third portion spaced apart and projecting toward a center of the tube; and
    securing the plurality of teeth to the tube.

2. The method of claim 1, wherein the securing comprises brazing.

3. The method of claim 2, comprising simultaneously securing all the teeth to the tube using furnace brazing.

4. The method of claim 1, wherein the securing comprises spot welding.

5. The method of claim 1, wherein the securing comprises seam welding.

6. The method of claim 1, wherein
    the tube includes a longitudinal slot;
    the teeth respectively include a slot; and
    the slots of the teeth are aligned with the longitudinal slot of the tube.

7. The method of claim 1, comprising providing guiding surfaces on an outside of the tube, the guiding surfaces extending parallel to a longitudinal axis of the tube.

8. The method of claim 7, wherein the guiding surfaces are on pieces projecting outwardly from an outer portion of the tube.

9. The method of claim 7, comprising
    situating a rotatable member including a plurality of magnets within an interior of the tube with the second portions and third portions of the teeth facing the magnets and with spacing between the magnets and the teeth;
    supporting the rotatable member on an elevator component that is moveable parallel to the longitudinal axis of the tube; and
    situating at least one guide member of the elevator component on at least one of the guiding surfaces, wherein the guide member and guiding surface maintain a desired spacing between the magnets and the second portions of the teeth and a desired spacing between the magnets and the third portions of the teeth.

10. The method of claim 1, comprising
    situating a rotatable member including a plurality of magnets within an interior of the tube with the second portions and third portions of the teeth facing the magnets and with spacing between the magnets and the second portions and third portions of the teeth; and
    situating a motor associated with the rotatable member within the interior of the tube, the motor selectively causing rotation of the rotatable member.

11. The method of claim 1, comprising
    situating a rotatable member including a plurality of magnets within an interior of the tube with the second portions and third portions of the teeth facing the magnets and with spacing between the magnets and the second portions and third portions of the teeth; and
    situating a brake associated with the rotatable member within the interior of the tube, the brake selectively resisting rotation of the rotatable member.

12. A magnetic drive assembly, comprising:
    a metal tube having an inner surface;
    a plurality of metal teeth inside the metal tube, the teeth respectively having a first portion received adjacent the inner surface of the tube, the teeth respectively having a second portion and a third portion spaced apart and projecting toward a center of the tube, the first portion, the second portion and the third portion of each of the teeth defining a body of the respective teeth, each body being a distinct component of the assembly independent of the tube; and at least one guiding surface on an outer portion of the tube, the at least one guiding surface extending parallel to a longitudinal axis of the tube.

13. The assembly of claim 12, comprising a plurality of bracket members secured to the outer portion of the tube, the bracket members respectively having a mounting portion that is configured for securing the bracket member to a wall.

14. The assembly of claim 12, wherein the teeth are secured to the tube.

15. The assembly of claim 14, wherein the teeth are secured to the tube by at least one of brazing, spot welding, and seam welding.

16. The assembly of claim 12, wherein
the tube includes a longitudinal slot;
the teeth respectively include a slot; and
the slots of the teeth are aligned with the longitudinal slot of the tube.

17. The assembly of claim 12, wherein the guiding surfaces are on pieces projecting outwardly from the outer portion of the tube.

18. The assembly of claim 12, wherein the teeth are generally helical and the plurality of teeth define a plurality of helical paths inside the tube.

19. The assembly of claim 12, wherein the teeth have a generally U shaped cross-section.

20. The assembly of claim 12, comprising:
a rotatable member including a plurality of magnets within an interior of the tube with the second portions and third portions of the teeth facing the magnets and with spacing between the magnets and the teeth;
an elevator component that is moveable parallel to the longitudinal axis of the tube, the rotatable member being supported on the elevator component; and
at least one guide member associated with the elevator component on the at least one guiding surface, the at least one guide member and guiding surface maintain a desired spacing between the magnets and the second portions of the teeth and a desired spacing between the magnets and the third portions of the teeth.

21. The assembly of claim 20, comprising
a motor associated with the rotatable member within the interior of the tube, the motor selectively causing rotation of the rotatable member; and
a brake associated with the rotatable member within the interior of the tube, the brake selectively resisting rotation of the rotatable member.

22. The assembly of claim 21, comprising
a battery supported on the elevator component, the battery providing power for operating the motor; and
an electrical drive device supported on the elevator component, the electrical drive device controlling operation of the motor.

23. The assembly of claim 22, wherein the elevator component comprises a counterweight.

24. The assembly of claim 20, comprising
a power source supported on the elevator component, the power source providing power for moving the rotatable member relative to the teeth; and
control electronics supported on the elevator component, the control electronics controlling movement of the rotatable member relative to the teeth.

* * * * *